US012094299B2

(12) United States Patent
Bryant et al.

(10) Patent No.: US 12,094,299 B2
(45) **Date of Patent: *Sep. 17, 2024**

(54) GAMING SYSTEM ENABLING MULTIPLE FEATURE MODES SELECTABLY TRIGGERABLE WITH ACCUMULATABLE ELIGIBILITIES

(71) Applicant: Aristocrat Technologies Australia Pty Limited, North Ryde (AU)

(72) Inventors: Natalie Bryant, Cherrybrook (AU); Nicole Hedley, Wahroonga (AU)

(73) Assignee: Aristocrat Technologies Australia Pty Limited, North Ryde (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/317,706

(22) Filed: May 15, 2023

(65) Prior Publication Data

US 2023/0290218 A1 Sep. 14, 2023

Related U.S. Application Data

(63) Continuation of application No. 17/677,172, filed on Feb. 22, 2022, now Pat. No. 11,688,241, which is a (Continued)

(30) Foreign Application Priority Data

May 28, 2019 (AU) ................................ 2019901836
Sep. 26, 2019 (AU) ................................ 2019236728

(51) Int. Cl.
*G07F 17/32* (2006.01)
*G07F 17/34* (2006.01)

(52) U.S. Cl.
CPC ...... *G07F 17/3258* (2013.01); *G07F 17/3209* (2013.01); *G07F 17/3213* (2013.01); (Continued)

(58) Field of Classification Search
None
See application file for complete search history.

(56) References Cited

U.S. PATENT DOCUMENTS 7,744,456 B2 6/2010 Walther
7,824,267 B2 11/2010 Cannon
(Continued)

OTHER PUBLICATIONS

Office Action dated Apr. 22, 2021 for U.S. Appl. No. 16/824,868 (pp. 1-9).
(Continued)

*Primary Examiner* — Jason T Yen
(74) *Attorney, Agent, or Firm* — McAndrews, Held & Malloy, Ltd.

(57) ABSTRACT

A gaming system includes a game controller to determine from a base game if an outcome meets a first eligibility, in response to the outcome meeting the first eligibility, increment a first counter, determine if the first counter meets a feature eligibility, in response to the first counter meeting the feature eligibility, increment a feature counter, determine jackpot features having jackpots, the jackpot features being associated with eligibility thresholds, and some of the jackpot features have different eligibility thresholds, provide on a display device one or more of the jackpot features having respective eligibility thresholds satisfied by the feature counter, receive, via a player interface, a selection of a first jackpot feature of the one or more of the plurality of jackpot features, and display the first jackpot feature selected.

20 Claims, 13 Drawing Sheets

Related U.S. Application Data continuation of application No. 16/824,868, filed on Mar. 20, 2020, now Pat. No. 11,257,326.

(52) U.S. Cl.
CPC ...... *G07F 17/3267* (2013.01); *G07F 17/3239* (2013.01); *G07F 17/34* (2013.01)

(56) References Cited

U.S. PATENT DOCUMENTS

| | | | | |
|---|---|---|---|---|
| 2003/0146574 A1* | 8/2003 | Duhamel | G07F 17/3258 | 273/292 |
| 2009/0117962 A1* | 5/2009 | Filipour | G07F 17/3258 | 463/16 |
| 2011/0130192 A1* | 6/2011 | Englman | G07F 17/3223 | 463/20 |
| 2012/0289325 A1* | 11/2012 | Kyte | G07F 17/3258 | 463/27 |
| 2013/0337903 A1* | 12/2013 | Schaefer | G07F 17/32 | 463/27 |
| 2016/0055718 A1* | 2/2016 | Lyons | G07F 17/3258 | 463/27 |
| 2018/0025589 A1* | 1/2018 | Luong | G07F 17/3244 | 463/20 |
| 2019/0102977 A1* | 4/2019 | Adair | G07F 17/3267 | |

OTHER PUBLICATIONS

Office Action (Notice of Allowance and Fees Due (PTOL-85)) dated Oct. 18, 2021 for U.S. Appl. No. 16/824,868 (pp. 1-9).
Office Action (Non-Final Rejection) dated Nov. 18, 2022 for U.S. Appl. No. 17/677,172 (pp. 1-6).
Office Action (Notice of Allowance and Fees Due (PTOL-85)) dated Feb. 16, 2023 for U.S. Appl. No. 17/677,172 (pp. 1-11).

* cited by examiner

400

421 422 423 424 425

| | Reel position | Reel 1 | Reel 2 | Reel 3 | Reel 4 | Reel 5 |
|---|---|---|---|---|---|---|
| 401 | 1 | Pic 1 | Trigger symbol | Pic 3 | Q | Pic 1 |
| 402 | 2 | K | Q | Trigger symbol | A | 10 |
| 403 | 3 | Trigger symbol | K | WILD | 10 | A |
| 404 | 4 | Q | A | Q | Pic 2 | Pic 2 |
| 405 | 5 | 10 | Pic 2 | K | J | A |
| 406 | 6 | WILD | 9 | Pic 1 | Trigger symbol | Q |
| 407 | 7 | Pic 2 | Pic 1 | J | 9 | K |
| 408 | 8 | A | Pic 3 | Pic 2 | 10 | Pic 3 |
| 409 | 9 | Q | Q | 9 | A | 9 |
| 410 | 10 | Trigger symbol | 10 | Q | WILD | K |
| 411 | 11 | J | A | 10 | J | WILD |
| 412 | 12 | 10 | WILD | K | K | Q |
| 413 | 13 | Pic 3 | K | Trigger symbol | 9 | 10 |
| 414 | 14 | K | J | A | Pic 3 | J |
| 415 | 15 | 9 | 10 | J | Pic 1 | Trigger symbol |

436 430 431

443 442 441

*FIG. 4*

GAMING SYSTEM ENABLING MULTIPLE FEATURE MODES SELECTABLY TRIGGERABLE WITH ACCUMULATABLE ELIGIBILITIES

RELATED APPLICATIONS

The present application is a continuation of and claims priority to U.S. patent application Ser. No. 17/677,172, filed Feb. 22, 2022, and entitled "A Gaming System Enabling Multiple Feature Modes Selectably Triggerable with Accumulatable Eligibilities" which is a continuation of and claims priority to U.S. patent application Ser. No. 16/824, 868, filed Mar. 20, 2020, which issued on Feb. 22, 2022, as U.S. Pat. No. 11,257,326, and entitled "A Gaming System Enabling Multiple Feature Modes Selectably Triggerable with Accumulatable Eligibilities" which claims priority to Australian Patent Application No. 2019901836, filed May 28, 2019, and Australian Patent Application No. 2019236728, filed Sep. 26, 2019, all of which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

A gaming system is described that has several jackpot features, with the jackpot features each having an eligibility threshold required by a player in order for the player to be able to play the feature. A particular example uses tickets that accumulate during game play, with defined numbers of required tickets being set for each jackpot feature. A player can select and play any jackpot feature that has a required number of tickets that is equal to or less than the number of tickets that the player has accumulated and, in this way, if the player has more tickets than more than one jackpot feature, the player can select from more than one jackpot feature, for example based on possible jackpot prize and/or jackpot volatility.

A gaming system is described that comprises at least one display and a game controller that includes at least one processor and at least one memory device. The at least one processor, the at least one memory device, and the at least one display are operably connected, and the at least one memory device stores computer-readable instructions for controlling the at least one processor to store jackpot eligibility information indicative of the extent of jackpot eligibility associated with a player, and provide a plurality of jackpot features, each jackpot feature having at least one associated jackpot. The instructions also cause the at least one processor to associate an eligibility threshold with each jackpot feature such that at least some of the plurality of jackpot features have different eligibility thresholds. The instructions also cause the at least one processor to enable a player to select and play any jackpot feature that has an eligibility threshold satisfied by the jackpot eligibility information, implement a selected jackpot feature, and award a jackpot prize associated with the jackpot feature if a winning jackpot is determined to exist.

A method of gaming is described that comprises storing jackpot eligibility information indicative of the extent of jackpot eligibility associated with a player, and providing a plurality of jackpot features, each jackpot feature having at least one associated jackpot. The method also comprises associating an eligibility threshold with each jackpot feature such that at least some of the plurality of jackpot features have different eligibility thresholds. The method also comprises enabling a player to select and play any jackpot feature that has an eligibility threshold satisfied by the jackpot eligibility information, implementing a selected jackpot feature; and awarding a jackpot prize associated with the jackpot feature if a winning jackpot is determined to exist.

BRIEF DESCRIPTION OF THE DRAWINGS

FIG. 4 illustrates an example reel strip layout.

DETAILED DESCRIPTION

Embodiments of the present disclosure represent an improvement in the art of electronic gaming machines, systems, and software for such electronic gaming machines or systems. For example, at least some embodiments of the present disclosure provide a visual correlation between jackpot features that are obtainable and available, game results, and amount of games that might result in other jackpot features being obtainable and available. In such embodiments, graphical or numerical presentation may also be displayed to correlate a first amount of tickets that a player has accumulated from a game, for example, a base game, with a second amount of tickets that the player has yet to obtain to be eligible for one or more of a plurality of jackpot features. When the player has obtained a number of tickets that a specific jackpot feature requires, the specific jackpot feature is made available to be selected and played.

The player may have an option to accumulate more tickets to be eligible for a different jackpot feature, or to play the specific jackpot feature. When the player has accumulated enough tickets to be eligible for both the specific jackpot feature and the different jackpot feature, both of the specific jackpot feature and the different jackpot feature are made available on the display to be selected and played. As the graphical or numerical presentation shows the player that he/she is getting closer to a next eligibility requirement, the player may feel a sense of accomplishment of achieving a goal and a further sense of anticipation, which leads to better player engagement. Further, the graphical or numerical presentation also provides simplified player experience such that the player may only need to focus on obtaining additional tickets, without being overly burdened by complicated calculations. Thus, embodiments of the present disclosure are not merely new game rules or simply new display patterns, but provide technologic improvements in the art of electronic gaming machines and software for such electronic gaming machines. Moreover, the above example is not intended to be limiting but merely exemplary of technologic improvements provided by some embodiments of the present disclosure. Technological improvements of other embodiments are readily apparent to those of ordinary skill in the art in light of the present disclosure.

Figure 1:
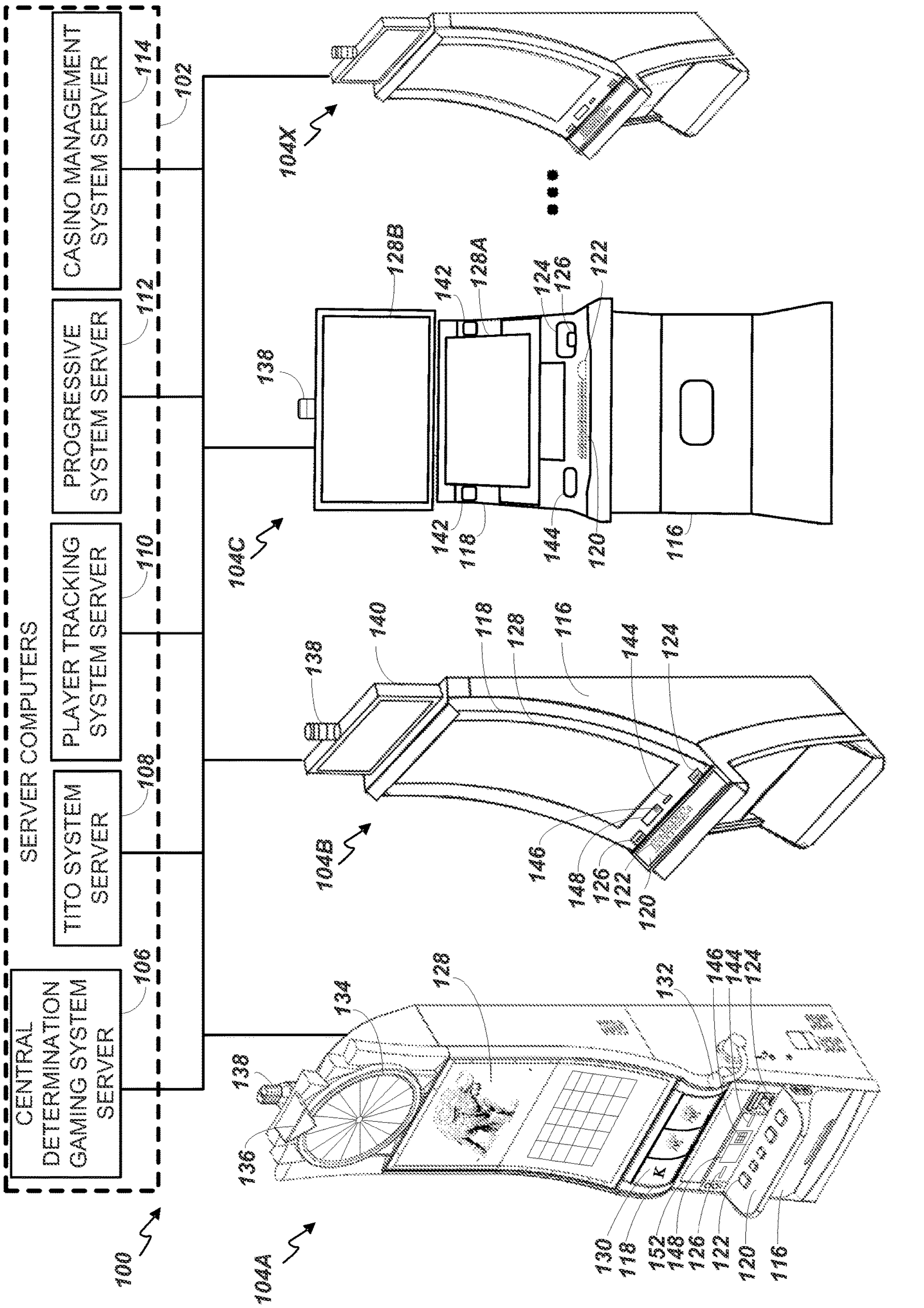
FIG. 1 is an exemplary diagram showing several EGMs networked with various gaming related servers.

FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a backlit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
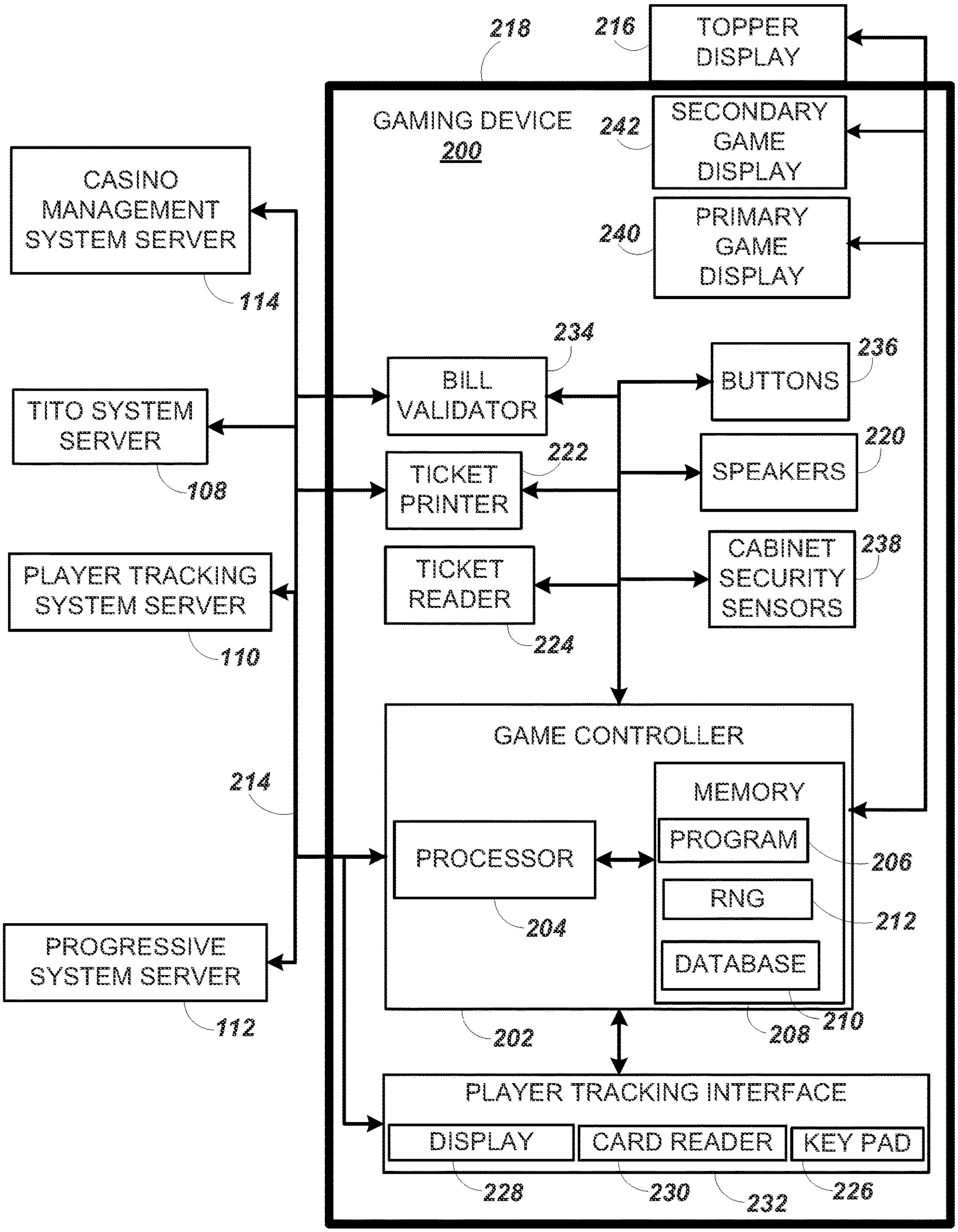
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
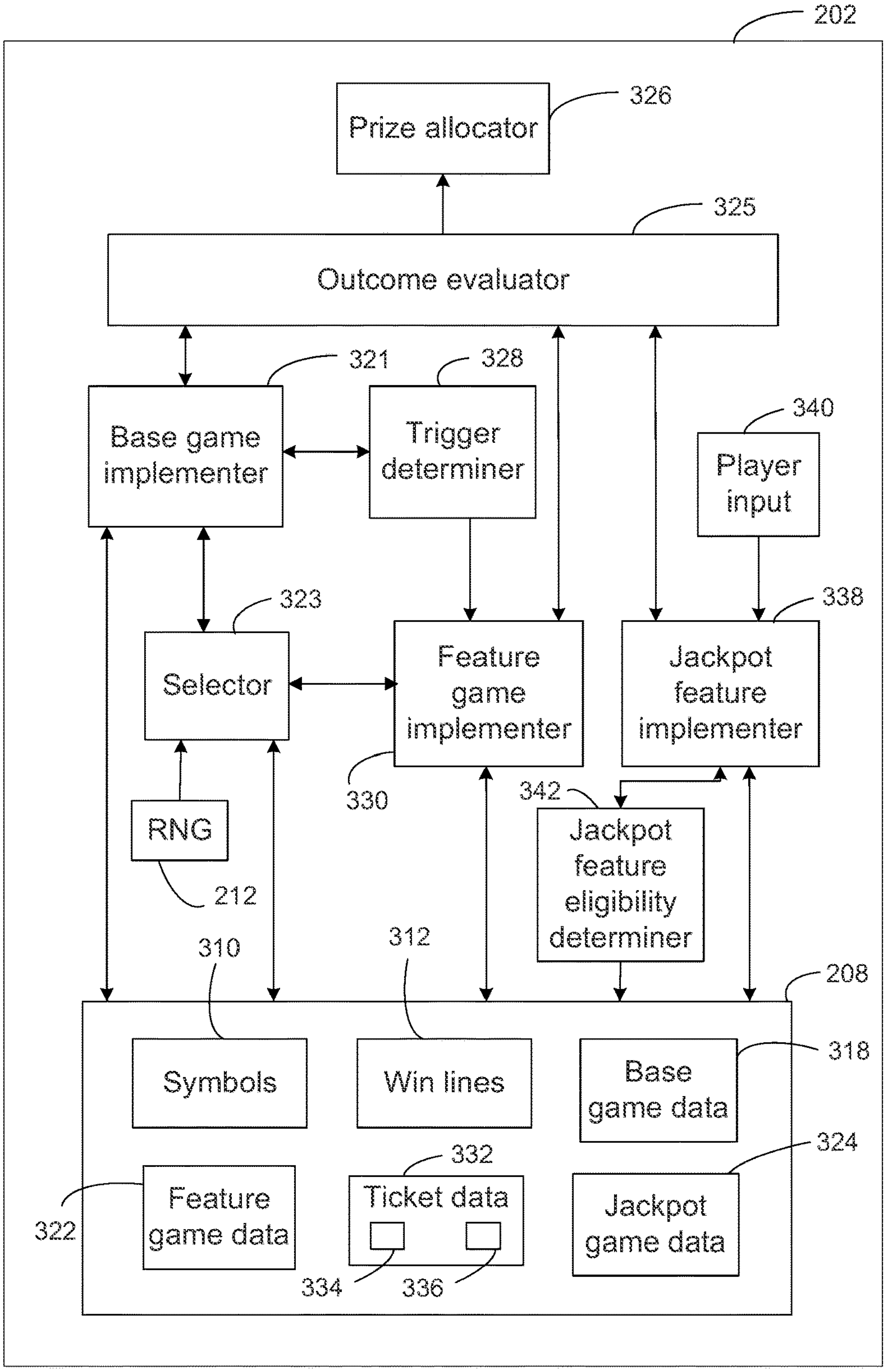
FIG. 3 is a block diagram showing functional components implemented by a game controller.

FIG. 3. illustrates a block diagram showing functional components implemented by the game controller 202. In this example, the functional components comprise data stored in the memory 208, including data indicative of symbols 310, data indicative of win lines 312, base game data 318 defining characteristics of a base game, feature game data 322 defining characteristics of a feature game and jackpot game data 324 defining characteristics of a jackpot game. The memory 208 also includes ticket data 332 indicative of a basic ticket count 334 and a golden ticket count 336.

The functional components also include a base game implementer 321 arranged to implement base games using a selector 323 to select symbols using the symbols data 310 for display at a plurality of symbol positions in a symbol array using the random number generator 212. Outcomes of a base game are determined by an outcome evaluator 325 and any applicable prize is awarded by a prize allocator 326, for example based on a base game pay table.

In this example, the functional components also include a trigger condition determiner 328 arranged to make a determination based on an event during a base game as to whether to commence a feature or free game, for example based on whether a trigger condition has occurred during the base game such as selection and display of a defined combination of trigger symbols during the base game.

The functional components also include a jackpot feature implementer 338 arranged to implement a jackpot feature that determines whether to award a jackpot. A plurality of jackpots are provided that have different associated jackpot values referred to as MINI, MINOR, MAJOR and GRAND jackpots and/or different respective win probabilities. Such jackpots may be of progressive type wherein the gaming device progressively contributes an amount of credits to one or more jackpot pools based for example on defined conditions during game play. In this example, the jackpots have different values such that the jackpot values of the MINI, MINOR, MAJOR and GRAND jackpots are of increasing size, and the jackpots are associated with jackpot features that share the same game theme, and each jackpot feature is associated with one or more jackpots and associated with a different sub-theme of the game theme. For example, the game theme may be a carnival theme and each jackpot feature may be associated with a different carnival sideshow, such as a carousel sideshow, a tumbler ride sideshow, a Ferris wheel sideshow or a roller coaster sideshow.

Eligibility for different jackpot features is determined by a jackpot feature eligibility determiner 342 based on the extent of jackpot eligibility accumulated by a player, such that the number of jackpot features available for selection by a player increases with increasing jackpot eligibility. Each jackpot feature has a different associated game play eligibility threshold, and a player is able to select a jackpot feature when the eligibility threshold for the jackpot feature is satisfied by jackpot eligibility information associated with the player. In this way, if the jackpot eligibility information satisfies multiple jackpot feature game play eligibility thresholds, the player is able to select from any one of multiple jackpot features, for example according to whether the player wishes to play a jackpot feature because the player wishes to play for a MINI, MINOR, MAJOR or GRAND jackpot or the player wishes to play for a jackpot based on a particular win probability. In some embodiments, the extent of jackpot eligibility is measured according to the number of tokens or tickets accumulated during game play. For example, tokens or tickets may be added when a defined symbol, such as a ticket symbol, is selected and displayed. Alternatively, jackpot eligibility may accumulate based on the amount bet such that a token or ticket is added for each defined amount bet by the player.

In an example implementation, several gaming machines are provided with each gaming machine arranged to implement a base game and feature game according to a defined sub-theme of a game theme common to the gaming machines, in addition to providing the opportunity to play for a jackpot using the accumulated tickets. For example, each base game may use symbols specific to the sub-theme, such as for example clown-themed symbols, and have an associated feature game that is a game of skill wherein the player attempts to control balls so that they drop into a clown's mouth.

In this way, when the gaming machines are disposed on a game floor adjacent each other, an impression is given of several related gaming machines, in this example several gaming machines that each have different carnival games that represent side show alley.

Outcomes of a feature game are in this example also determined by the outcome evaluator 325 and any applicable prize is awarded by the prize allocator 326.

FIG. 4 illustrates an example of a set 400 of five reel strips 421, 422, 423, 424, 425. In the example, each reel strip has fifteen reel strip positions 401-415. Each reel strip position of each reel has a symbol. For example, a "Wild" symbol 431 occupies the tenth reel strip position 410 of the fourth reel 424. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 5:
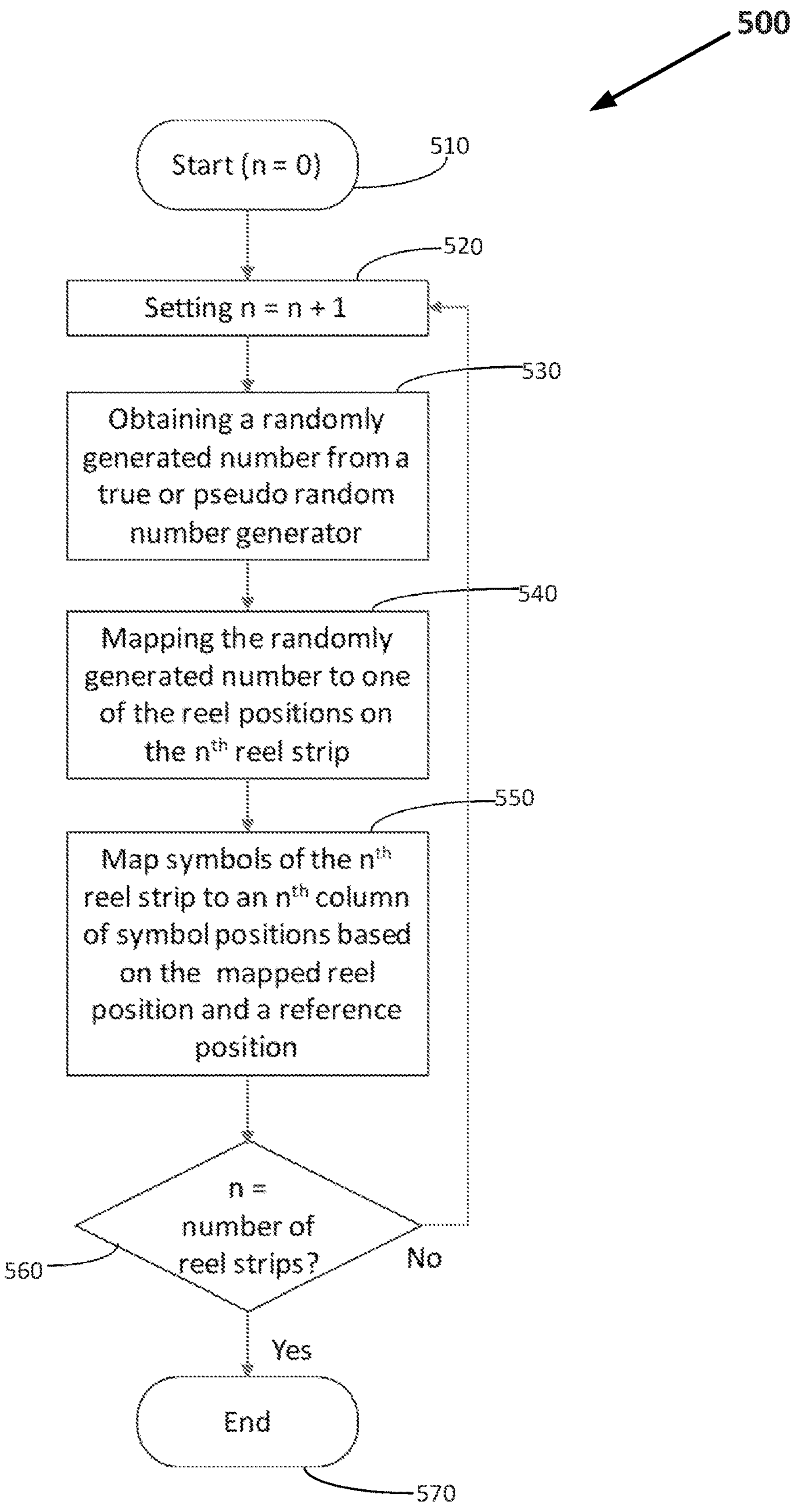
FIG. 5 is a flow chart of a symbol selection method.

FIG. 5 is a flow chart of a method 500 carried out by the processor 204 to select symbols from reel strips. At step 510, the processor 204 starts the process of selecting symbols with a counter (n) set at zero as symbols have not yet been selected from any reel strips. At step 520, the processor 204 increments the counter. In the first iteration, the counter is set to 1 to reflect that symbols are to be selected from a first reel strip. At step 530 the processor obtains a randomly generated number from a true or pseudo random number generator 212. At step 540, the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 550, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 413, then for the first reel strip 421, "Pic3" symbol 443 is mapped to a bottom symbol position, "10" symbol 442 is mapped to a middle symbol position, and "J" symbol is mapped to a top symbol position.

At step 560, the processor 560 determines whether symbols have been selected for all of the reel strips, and if not the processor reverts to step 520 and iterates through steps 530, 540 and 550 until it is determined at step 560 that symbols have been selected from all n reel strips and mapped to all n columns of symbol positions after which the symbol selection process ends 570. Different numbers of symbols may be mapped to different numbers of symbol positions.

After the symbols of all reel strips have been mapped to symbol positions, the processor 204 controls display 240 to display them at the symbol positions.

Figure 6:
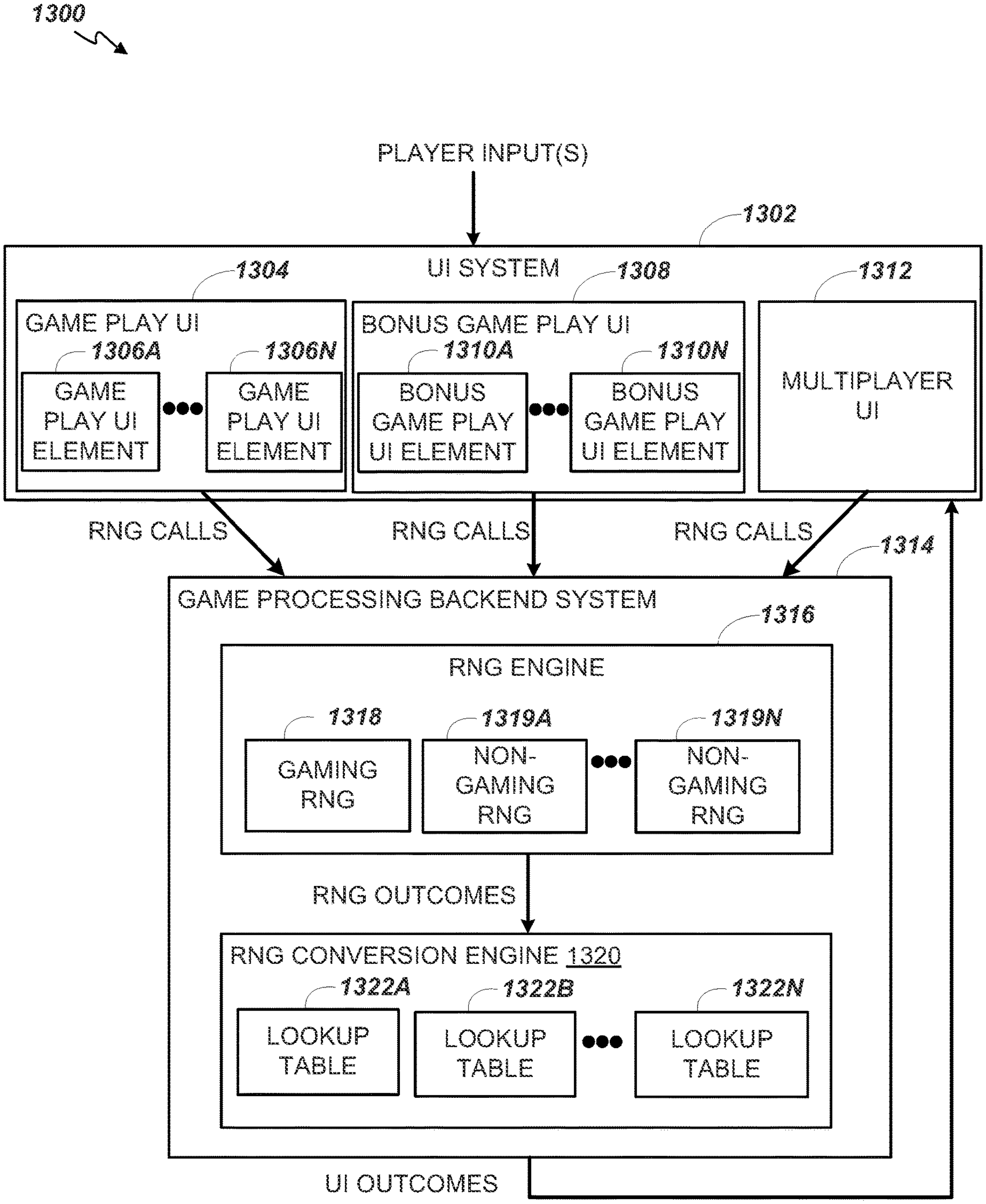
FIG. 6 illustrates, in block diagram form, an embodiment of a game processing architecture that implements a game processing pipeline for the play of a game in accordance with various embodiments described herein.

FIG. 6 illustrates, in block diagram form, an embodiment of a game processing architecture 300 that implements a game processing pipeline for the play of a game in accordance with various embodiments described herein. As shown in FIG. 6, the gaming processing pipeline starts with having a UI system 1302 receive one or more player inputs for the game instance. Based on the player input(s), the UI system 1302 generates and sends one or more RNG calls to a game processing backend system 1314. Game processing backend system 1314 then processes the RNG calls with RNG engine 1316 to generate one or more RNG outcomes. The RNG outcomes are then sent to the RNG conversion engine 1320 to generate one or more game outcomes for the UI system 1302 to display to a player. The game processing architecture 1300 can implement the game processing pipeline using a gaming device, such as gaming devices 104A-104X and 200 shown in FIGS. 1 and 2, respectively. Alternatively, portions of the gaming processing architecture 1300 can implement the game processing pipeline using a gaming device and one or more remote gaming devices, such as central determination gaming system server 106 shown in FIG. 1.

The UI system 1302 includes one or more UIs that a player can interact with. The UI system 1302 could include one or more game play UIs 1304, one or more bonus game play UIs 1304, and one or more multiplayer UIs 1306, where each UI type includes one or more mechanical UIs and/or graphical UIs (GUIs). In other words, game play UI 1304, bonus game play UI 1304, and the multiplayer UI 1304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 6 as an example, the different UI elements are shown as game play UI elements 1306A-1306N and bonus game play UI elements 1310A-1310N.

The game play UI 1304 represents a UI that a player typically interfaces with for a base game. During a game instance of a base game, the game play UI elements 1306A-1306N (e.g., GUI elements depicting one or more virtual reels) are shown and/or made available to a user. In a subsequent game instance, the UI system 1302 could transition out of the base game to one or more bonus games. The bonus game play UI 1308 represents a UI that utilizes bonus game play UI elements 1310A-1310N for a player to interact with and/or view during a bonus game. In one or more embodiments, at least some of the game play UI element 1306A-1306N are similar to the bonus game play UI elements 1310A-1310N. In other embodiments, the game play UI element 1306A-1306N can differ from to the bonus game play UI elements 1310A-1310N.

FIG. 6 also illustrates that UI system 1302 could include a multiplayer UI 1312 purposed for game play that differ or is separate from the typical base game. For example, multiplayer UI 1302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 1316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 6 does not explicitly depict that multiplayer UI 1312 includes UI elements, multiplayer UI 1312 could also include one or more multiplayer UI elements.

Based on the player inputs, the UI system 1302 could generate RNG calls to a game processing backend system 1314. As an example, the UI system 1302 could use one or more application programming interfaces (APIs) to generate the RNG calls. To process the RNG calls, the RNG engine 1316 could utilize gaming RNG 1318 and/or non-gaming RNGs 1319A-1319N. Gaming RNG 1318 corresponds to RNG 212 shown in FIG. 2. As previously discussed with reference to FIG. 2, gaming RNG 1318 often performs specialized and non-generic operations that comply with regulatory and/or game requirements. For example, because of regulation requirements, gaming RNG 1318 could be a cryptographic random or pseudorandom number generator (PRNG) (e.g., Fortuna PRNG) that securely produces random numbers for one or more game features. To generate random numbers, gaming RNG 1318 could collect random data from various sources of entropy, such as from an operating system (OS). Alternatively, non-gaming RNGs 1319A-1319N may not be cryptographically secure and/or be computational less expensive. Non-gaming RNGS 1319A-1319N can, thus, be used to generate outcomes for non-gaming purposes. As an example, non-gaming RNGs 1319A-1319N can generate random numbers for such as generating random messages that appear on the gaming device. The RNG conversion engine 1320 processes each RNG outcome from RNG engine 1316 and converts the RNG outcome to a UI outcome that is feedback to the UI system 1302. With reference to FIG. 2, RNG conversion engine 1320 corresponds to RNG conversion engine 210 used for game play. As previously described, RNG conversion engine 1320 translates the RNG outcome from the RNG 212 to a game outcome presented to a player. RNG conversion engine 1320 utilizes one or more lookup tables 1322A-1322N to regulate a prize payout amount for each RNG outcome and how often the gaming device pays out the derived prize payout amounts. In one example, the RNG conversion engine 1320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 1314 sends the UI outcome to the UI system 1302. Examples of UI outcomes are symbols to display on a video reel or reel stops for a mechanical reel. In one example, if the UI outcome is for a base game, the UI system 1302 updates one or more game play UI elements 1306A-1306N, such as symbols, for the game play UI 1304. In another example, if the UI outcome is for a bonus game, the UI system could update one or more bonus game play UI elements 1310A-1310N (e.g., symbols) for the bonus game play UI 1308. In response to the updating the appropriate UI, the player may subsequently provide additional player inputs to initiate a subsequent game instance that progresses through the game processing pipeline.

Figure 7:
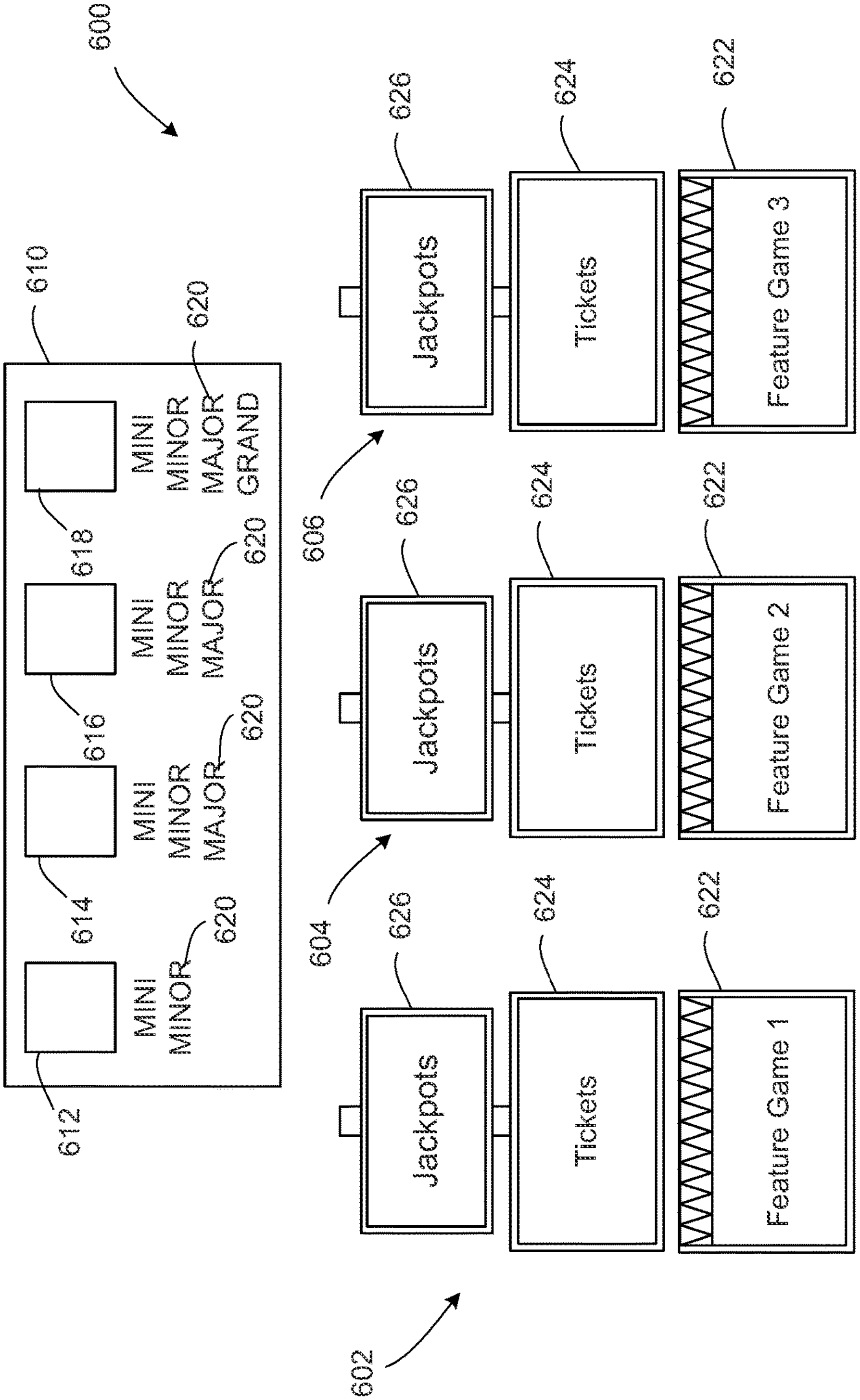
FIG. 7 is a representation of a bank of EGMs according to an embodiment of the present disclosure.

An example gaming system 600 including multiple gaming machines 602, 604, 606 is shown in FIG. 7. The system 600 includes a common display device 610 that may be used to display visuals for all available jackpot features 612, 614, 616, 618 together with an indication as to which jackpots are available in the jackpot features, wherein a representation of the jackpot feature is shown together with the relevant jackpots that are associated with the jackpot feature. In the present example, a first jackpot feature 612 is associated with MINI and MINOR jackpots, a second jackpot feature 614 is associated with MINI, MINOR and MAJOR jackpots, a third jackpot feature 616 is associated with MINI, MINOR and MAJOR jackpots, and a fourth jackpot feature 618 is associated with a MINI, MINOR, MAJOR and GRAND jackpots. In addition, or alternatively, each current jackpot amount may be shown on the common display device 610 adjacent the relevant jackpot.

As described above, the eligibility into the jackpot features 612, 614, 616, 618 is generally based on meeting a certain threshold of eligibility points, for example, the tickets accumulated. In some embodiments, in addition to the certain threshold of eligibility points being used as an eligibility, there may be a second eligibility criteria required to enable a period of time within which the jackpot features 612, 614, 616, 618 may be played, which may also be time-based triggered or randomly triggered. In other embodiments, the player may have complete control as to when the jackpot features 612, 614, 616, 618 is initiated. In cases where the player has the complete control, while the certain threshold of eligibility points may be used as an eligibility, the jackpot features 612, 614, 616, 618 may be initiated when the player initiates the jackpot features 612, 614, 616, 618.

In an example, the multiple gaming machines 602, 604, 606 are associated with the same game theme, with each gaming machine having a different sub-theme of the game theme. For example, the gaming machines of the present embodiment are all associated with a carnival theme and each gaming machine has a different carnival related theme, such as a clown related theme, a duck shooting gallery related theme, or a balloon bursting related theme. Each sub-theme is such that symbols related to the sub-theme are used in base games, and a feature game that conforms to the sub-theme is implemented when a suitable trigger condition occurs during the base game. For example, 3 types of sub-themed gaming machines 602, 604, 606 may be provided, including a first type that has a clown related sub-theme using clown symbols during a base game and providing a clown related feature game, a second type that has a duck shooting gallery related sub-theme using duck symbols during a base game and providing a duck shooting feature game, and a third type that has a balloon bursting related sub-theme using balloon symbols during a base game and providing a balloon bursting feature game.

While the gaming machines 602, 604, 606 provide different sub-themes and different feature games, each of the gaming machines also provides a player with the opportunity to select and play a jackpot feature of a plurality of jackpot features when respective game play thresholds have been met for the jackpot games.

In this example, the jackpots are of progressive type and, as such, each of the gaming machines 602, 604, 606 contributes an amount of player spend to pools associated with the jackpots.

Figure 8:
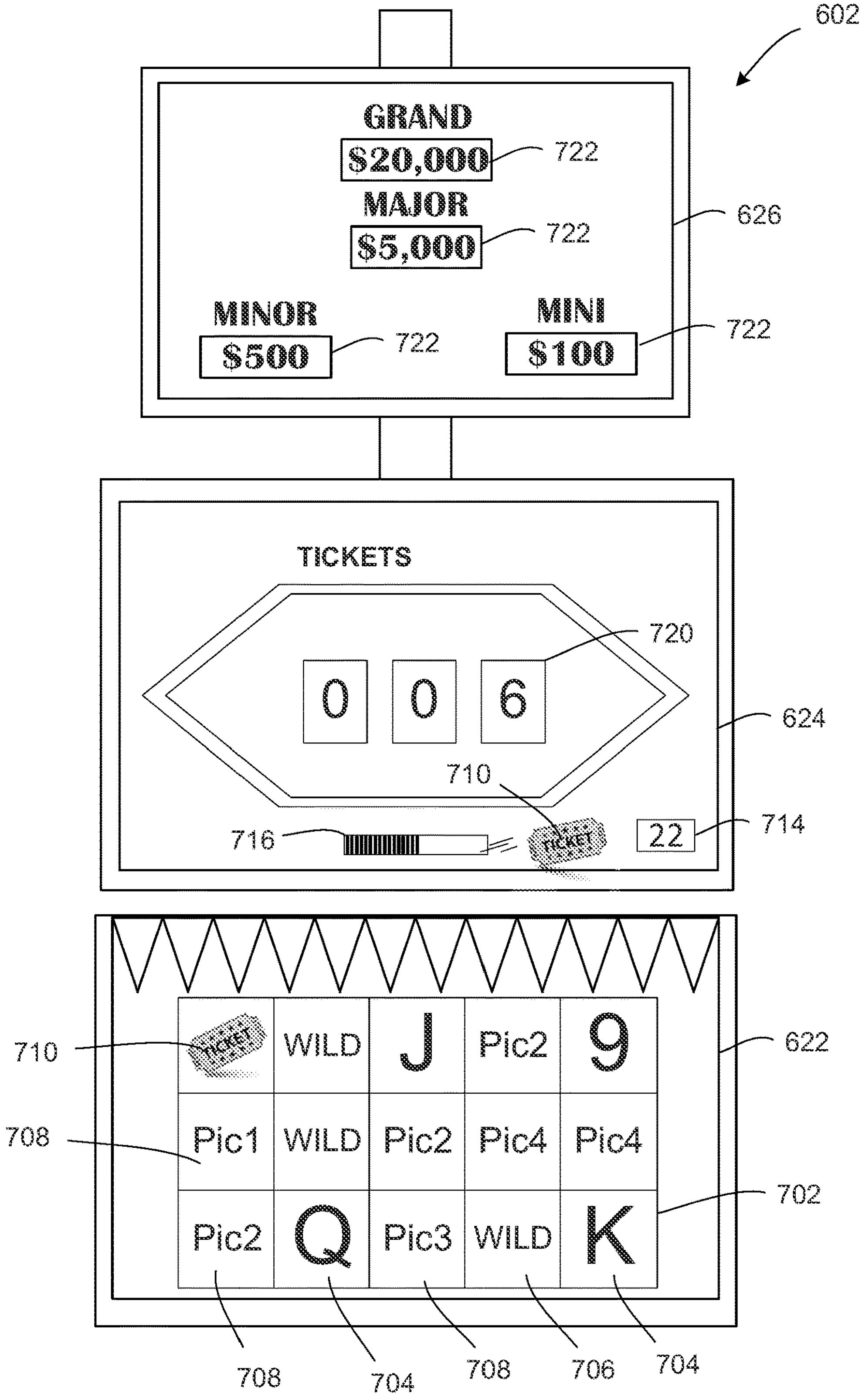
FIG. 8 is a representation of screens of an EGM according to an embodiment of the present disclosure during implementation of a base game.

User Interface of an example gaming machine 602 are shown more particularly in FIG. 8. As shown, during implementation of a base game, a game screen 622 displays a symbol array 702 that includes a plurality of symbols selected by the game controller 202 from the available symbols 310 using the random number generator 212. The available symbols 310 include standard symbols 704, Wild symbols 706, picture symbols 708 that for example conform to the sub-theme associated with the gaming machine 602, and ticket symbols 710.

Display of a ticket symbol 710 is used to communicate to the player that a basic ticket has been awarded.

In the present embodiment, eligibility for each jackpot game is based on a defined number of 'golden tickets', wherein each golden ticket is awarded to a player when a defined number of basic tickets have been awarded to the player. For example, each basic ticket may be awarded to the player during game play based on selection and display of a defined symbol, and a golden ticket awarded to the player after 30 basic tickets have been awarded. The golden tickets are used to gain eligibility to play the jackpot features, for example such that a first jackpot feature requires 1 golden ticket to play, a second jackpot feature requires 3 golden tickets to play, a third jackpot feature requires 5 golden tickets to play, and a fourth jackpot feature requires 10 golden tickets to play.

The number of ticket symbols available for selection and display may vary according to the amount bet such that for example the number of ticket symbols increases and therefore the likelihood of receiving a ticket during game play increases with increasing bet. In various embodiments, additional ticket symbols are added to one or more reel strips used for the one or more reels corresponding to columns in the base game outcome.

Consistent with the increasing eligibility requirement for the jackpot features, the jackpot amounts available in the jackpot features also increase with the increasing eligibility requirement, and/or the volatility of available jackpot selections increases with increasing eligibility requirement.

In this example, a ticket screen 624 is used to display a basic ticket count 714 representing the number of basic tickets awarded since the player last received a golden ticket, and/or a ticket progress graphic 716 that graphically indicates the progress towards receiving a golden ticket. The ticket screen 624 also includes a golden ticket count 720 that indicates to the player how many golden tickets have been awarded.

In this example, a graphic sequence is also displayed when a basic ticket is awarded, by displaying a ticket symbol 710 that moves from the symbol array 702 to the ticket screen 624, and animating the basic ticket count 714 and/or the basic ticket progress bar 716.

In this example, all jackpot amounts 722 are also displayed at the gaming machine 602, for example on a top screen 626.

Figure 9:
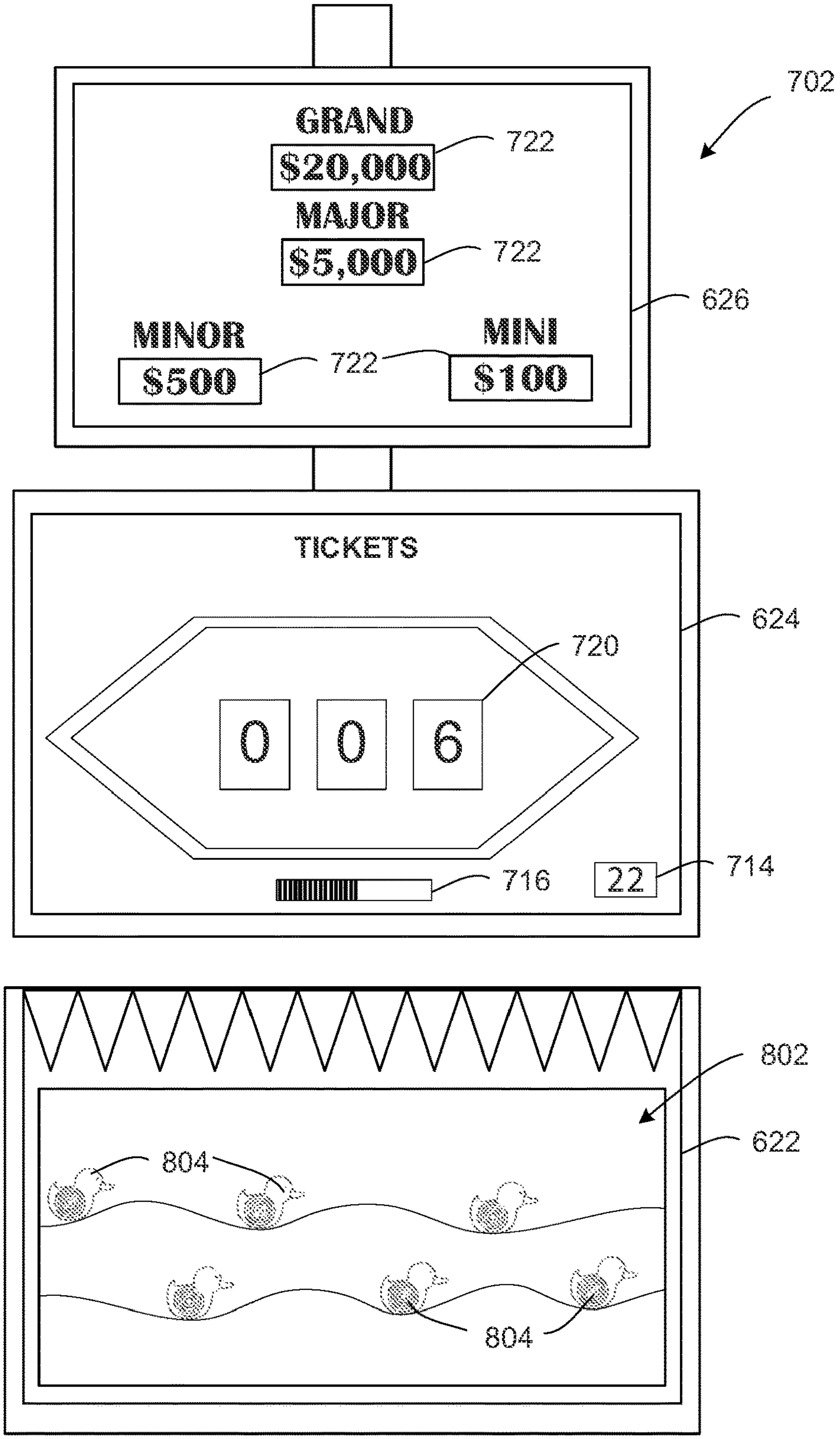
FIG. 9 is a representation of screens of the EGM shown in FIG. 7 during implementation of a feature game.

During base game play, if a trigger condition occurs, for example display of a defined symbol or combination of symbols such as display of 3 special symbols that are associated with the sub-theme of the gaming machine 602, a feature game associated with the sub-theme is implemented. In this example, the feature game is implemented on the game screen 622 such that the feature game is displayed on the game screen instead of the base game, as shown in FIG. 9.

In the present example, the feature game is a shooting ducks game 802 wherein a player attempts to shoot ducks 804 as the ducks move across the screen, for example using gaming machine buttons 236. In this way, the feature game is interactive in that a degree of player skill is required in order to be successful. However, it will be understood that other types of feature games, including feature games that do not require player skill, are envisaged.

Figure 10:
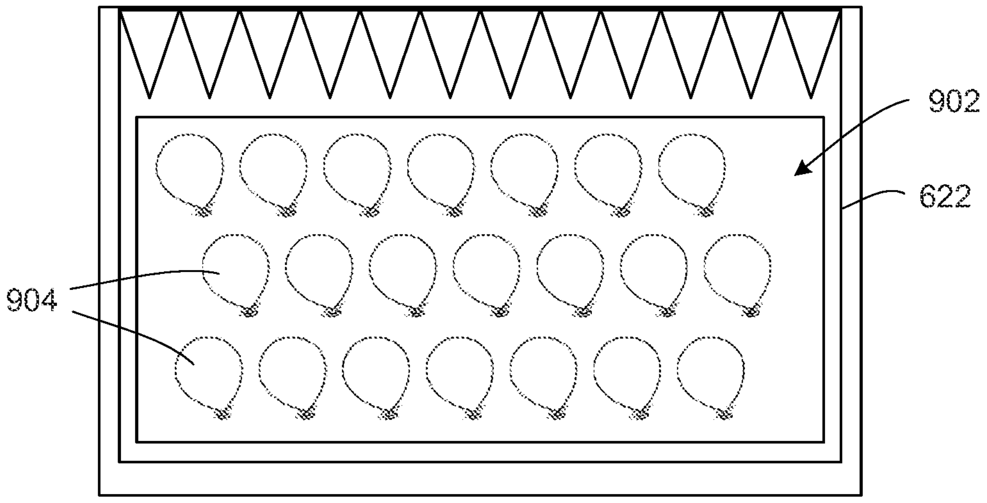
FIG. 10 is a representation of a game screen of an alternative EGM during implementation of a feature game.
Figure 11:
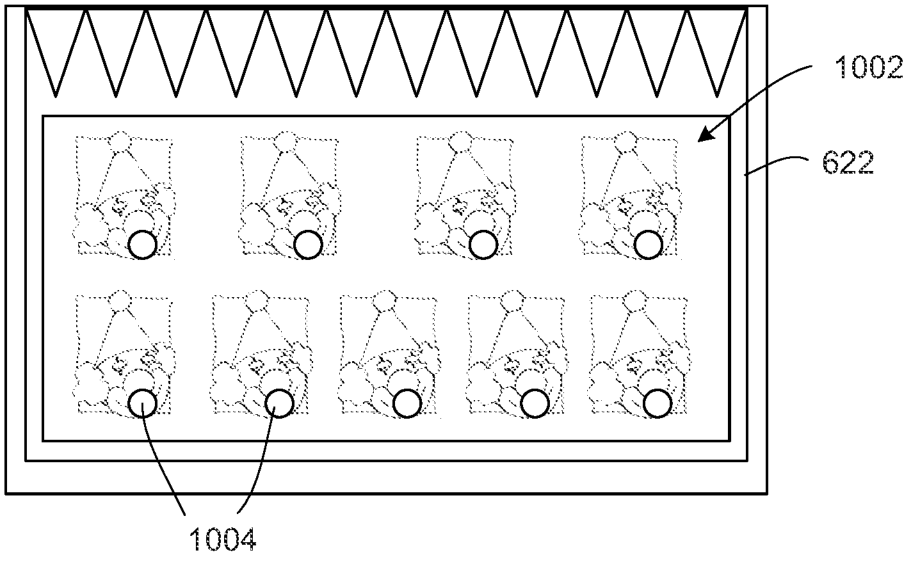
FIG. 11 is a representation of a game screen of a further alternative EGM during implementation of a feature game.

Alternative feature game examples 902, 904 are shown respectively in FIGS. 10 and 11 that show different feature games corresponding to alternate sub-themes of the general game theme used in the gaming system 600. FIG. 10 shows a bursting balloon type feature game 902 wherein a player is required to burst balloons 904, and FIG. 11 shows a clown type feature game 1002 wherein a player is required to drop balls into mouths of clowns 1004, although it will be understood that other feature games are envisaged.

Figure 12:
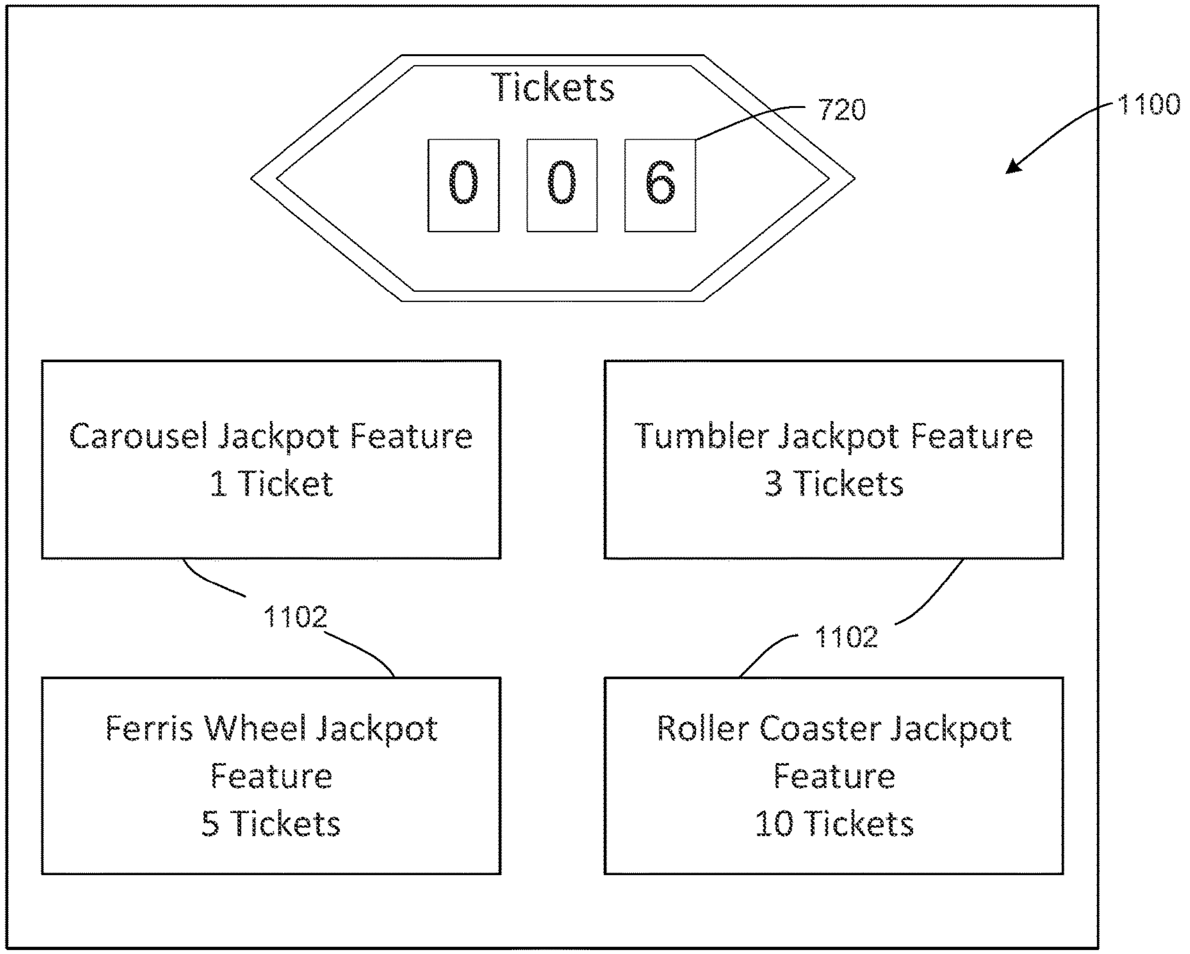
FIG. 12 is a representation of a screen displayed to a player in order to enable the player to select a jackpot feature.

Referring to FIG. 12, an example jackpot feature selection screen 1100 displayed to a player when the player provides a gaming machine input to indicate that the player wishes to play a jackpot feature is shown. In this example, the jackpot feature selection screen 1100 is displayed on the ticket screen 624 in response to a player pressing a jackpot play button. The player may be able to select a jackpot feature at any time, or only at specific time(s).

The jackpot feature selection screen 1100 shows the golden ticket count 720 and indicia representing the jackpot features 1102, in this example a carousel jackpot feature, a tumbler jackpot feature, a Ferris wheel jackpot feature and a roller coaster jackpot feature. It will be understood that a jackpot feature 1102 is selectable by the player only if the player has a sufficient number of golden tickets, and the player is able to select any jackpot feature that requires an equal or fewer number of golden tickets.

In the present example, the player has 6 golden tickets so can only select and play the carousel jackpot feature, the tumbler jackpot feature or the Ferris wheel jackpot feature. Since each of the available jackpot features has one or more different associated jackpots and/or different respective win probabilities, the player may select a jackpot feature based on whether the player wishes to have the opportunity to receive a larger award or the player wishes to have a higher win likelihood but a lower award.

Figure 13:
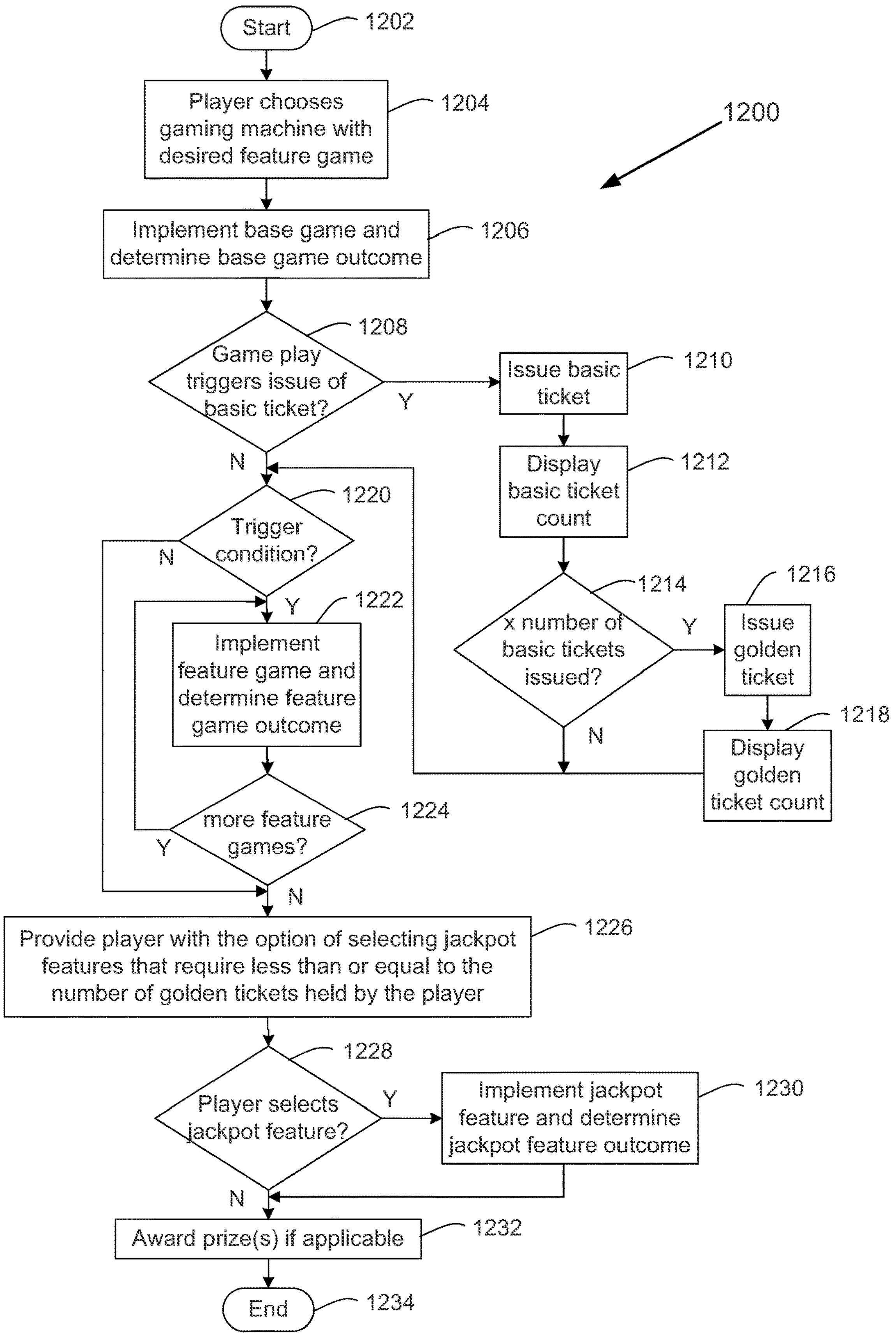
FIG. 13 is a flow chart illustrating an example game play process of an example method of gaming.

An example will now be described with reference to steps 1202 to 1234 of flow diagram 1200 shown in FIG. 13 and with reference to the embodiments shown in FIGS. 7 to 12 of the drawings.

As indicated at step 1204, a player first selects one of the gaming machines associated with a desired theme, in this example a carnival theme, for example because the player is attracted to the theme, the sub-theme used by the gaming machine or the player wishes to otherwise play the feature game associated with the gaming machine.

After selection of the gaming machine, the player adds credit to the gaming machine in any suitable way, and in response to user input, the gaming machine implements a base game and determines a base game outcome, as indicated at step 1206.

The extent of game play is recorded by the gaming machine 602, 604, 606, in this example by adding a basic ticket to a basic ticket count 714 when a ticket symbol 710 is selected and displayed, as indicated at steps 1208 and 1210, and displaying the basic ticket count 714 on the gaming machine display, as indicated at step 1212.

As indicated at steps 1214, 1216 and 1218, if a defined number of basic tickets have issued since a golden ticket was last awarded, in this example 30 basic tickets, a golden ticket is issued to the player and added to the golden ticket count 720 on the gaming machine displays.

As indicated at steps 1220 and 1222, if a trigger condition occurs during the base game, in this example display of 3 trigger symbols that are themed according to the sub-theme of the gaming machine 602, 604, 606, a feature game corresponding to the sub-theme is implemented.

In this example, the player, at any time, has the opportunity to select a jackpot feature if the jackpot feature requires the same or fewer golden tickets than the player has, as shown at step 1226. In other examples, the player may only be able to select a jackpot feature at specific time(s). For example, the gaming machine is configured to offer the player to select an eligible jackpot feature at random times or at regular intervals. Additionally or alternatively, the gaming machine is configured to offer the player to select an eligible jackpot feature during a specific time window, such as in between two consecutive rounds or game instances. In either case, the jackpot play button even if pressed outside the specific time(s) would not activate the jackpot feature selection screen 1100.

In other embodiments, the player may be allowed to choose whether and when to turn in the tickets accumulated, which provides the player opportunities to pick a feature volatility that appeals to the player. For example, a player that prefers the action of frequent feature events may choose to play lower cost features as soon as the eligibility criteria are met, whereas a player that prefers the excitement of playing for a bigger jackpot prize may choose to hold on to the tickets accumulated until enough tickets to play for bigger jackpots have been accumulated.

As indicated at steps 1228, 1230 and 1232, if the player selects a jackpot feature, the jackpot feature is implemented and a prize is awarded if applicable.

The jackpot feature may be implemented on one or more of the displays of the player's gaming machine 602, 604, 606 or on the common display 610, and the jackpot feature may be at least partly player skill-based or not based on player skill at all.

In accordance with a first aspect of the present disclosure, there is provided a gaming system comprising: at least one display; a game controller that includes at least one processor and at least one memory device, wherein: the at least one processor, the at least one memory device, and the at least one display are operably connected; and the at least one memory device stores computer-readable instructions for controlling the at least one processor to: store jackpot eligibility information indicative of the extent of jackpot eligibility associated with a player; provide a plurality of jackpot features, each jackpot feature having at least one associated jackpot; associate an eligibility threshold with each jackpot feature such that at least some of the plurality of jackpot features have different eligibility thresholds; enable a player to select and play any jackpot feature that has an eligibility threshold satisfied by the jackpot eligibility information; implement a selected jackpot feature; and award a jackpot prize associated with the jackpot feature if a winning jackpot is determined to exist.

In an embodiment, all of the plurality of jackpot features have different eligibility thresholds.

In an embodiment, the jackpot eligibility information is stored as a number of tickets, each ticket accumulated based on a game event.

In an embodiment, the tickets comprise first tickets accumulated based on a game event and second tickets corresponding to a defined amount of first tickets, wherein the number of second tickets accumulated by a player is displayed.

In an embodiment, each ticket corresponds to a defined credit amount bet by the player.

In an embodiment, each ticket is awarded when a defined symbol is selected and displayed.

In an embodiment, the at least one memory device stores computer-readable instructions for controlling the at least one processor to: display information indicative of progress towards obtaining a second ticket.

In an embodiment, the information indicative of progress towards obtaining a second ticket comprises a number.

In an embodiment, the information indicative of progress towards obtaining a ticket comprises a progress bar graphic.

In an embodiment, at least one jackpot feature is associated with a plurality of jackpots having different jackpot amounts.

In an embodiment, the plurality of jackpot features have progressively increasing eligibility thresholds.

In an embodiment, at least some of plurality of jackpot features have different associated jackpot win probabilities.

In an embodiment, at least one jackpot is a progressive jackpot.

In an embodiment, the at least one memory device stores computer-readable instructions for controlling the at least one processor to: enable a player to select and play any jackpot feature that has an eligibility threshold satisfied by the jackpot eligibility information at any time.

In an embodiment, the at least one memory device stores computer-readable instructions for controlling the at least one processor to: implement a base game; determine whether a trigger condition has occurred during the base game; and implement a feature game when the trigger condition has occurred.

In an embodiment, the gaming system includes a plurality of gaming machines, each gaming machine comprising: at least one display; a game controller that includes at least one processor and at least one memory device, wherein: the at least one processor, the at least one memory device, and the at least one display are operably connected; and the at least one memory device stores computer-readable instructions for controlling the at least one processor to: store jackpot eligibility information indicative of the extent of jackpot eligibility associated with a player; provide a plurality of jackpot features, each jackpot feature having at least one associated jackpot; associate an eligibility threshold with each jackpot feature such that at least some of the plurality of jackpot features have different eligibility thresholds; enable a player to select and play any jackpot feature that has an eligibility threshold satisfied by the jackpot eligibility information; implement a selected jackpot feature; and award a jackpot prize associated with the jackpot feature if a winning jackpot is determined to exist.

In an embodiment, the plurality of gaming machines have a common game theme, and at least some of the gaming machine have different game sub-themes of the common game theme.

In an embodiment, the gaming system comprises a common display arranged to display information indicative of the plurality jackpot features.

In accordance with a third aspect of the present disclosure, there is provided a method of gaming comprising: storing jackpot eligibility information indicative of the extent of jackpot eligibility associated with a player; providing a plurality of jackpot features, each jackpot feature having at least one associated jackpot; associating an eligibility threshold with each jackpot feature such that at least some of the plurality of jackpot features have different eligibility thresholds; enabling a player to select and play any jackpot feature that has an eligibility threshold satisfied by the jackpot eligibility information; implementing a selected jackpot feature; and awarding a jackpot prize associated with the jackpot feature if a winning jackpot is determined to exist.

While the disclosure has been described with respect to the figures, it will be appreciated that many modifications and changes may be made by those skilled in the art without departing from the spirit of the disclosure. Any variation and derivation from the above description and Figures are included in the scope of the present disclosure as defined by the claims.

What is claimed is:

1. A gaming system comprising:

a gaming device having a display device; and at least one server operable to be coupled to the gaming device, and comprising at least one processor and memory storing a plurality of instructions, which, when executed, cause the at least one processor to at least:

control the display device to display a first outcome based on a random event generated by a random number generator, control the display device to animate a first increment at a first counter when the first outcome meets a first eligibility for a first jackpot feature among a plurality of jackpot features, wherein the plurality of jackpot features have volatilities that increase with increasing eligibilities, and at least two of the plurality of jackpot features have different eligibilities, control the display device to animate a second increment at a first feature counter when the first counter meets a first feature eligibility, and control the display device to animate a number of the jackpot features that are eligible to be selected based on the first feature counter.

2. The gaming system of claim 1, wherein the first eligibility is met when the first outcome includes a ticket symbol, and wherein the instructions, when executed, further cause the at least one processor to transmit a graphic sequence to the gaming device for animating the ticket symbol being moved from the first outcome into the first counter.

3. The gaming system of claim 1, and wherein the instructions, when executed, further cause the at least one processor to animate the first outcome based on a player interaction with the random event.

4. The gaming system of claim 1, wherein the first eligibility comprises a plurality of first tickets, each of the plurality of first tickets being accumulated based on the first outcome.

5. The gaming system of claim 4, wherein each of the plurality of first tickets corresponds to a defined credit amount wagered.

6. The gaming system of claim 4, wherein each of the plurality of first tickets is awarded when a defined symbol is selected.

7. The gaming system of claim 1, wherein the instructions, when executed, further cause the at least one processor to animate a progress towards obtaining one or more of a plurality of second tickets that comprise at least one of a value and a progress bar graphic.

8. A method of animating a feature game in a gaming system comprising at least one server, the method comprising:

causing a gaming device, coupled to the at least one server that transmits at least one message to the gaming device, to animate an outcome of a base game based on a random event generated by a random number generator;

causing the gaming device, coupled to the at least one server that transmits the at least one message to the gaming device, to animate a base counter being incremented based on the outcome when the outcome meets an eligibility for a first jackpot feature among a plurality of jackpot features, wherein the plurality of jackpot features having volatilities that increase with increasing eligibilities, and at least two of the plurality of jackpot features have different eligibilities; and causing the gaming device, coupled to the at least one server that transmits the at least one message to the gaming device, to animate a number of the jackpot features that are eligible to be selected based on a feature counter that reflects a feature eligibility having been met with respect to the base counter reaching an eligibility threshold.

9. The method of claim 8, wherein the eligibility is met when the outcome includes a ticket symbol, further comprising transmitting a graphic sequence to the gaming device for animating the ticket symbol being moved from the outcome into the base counter.

10. The method of claim 8, further comprising animating the outcome based on a player interaction with the random event.

11. The method of claim 8, wherein the outcome comprises a plurality of first tickets, each of the plurality of first tickets being accumulated based on the outcome.

12. The method of claim 11, wherein each of the plurality of first tickets corresponds to a defined credit amount wagered, and each of the plurality of first tickets is awarded when a defined symbol is selected.

13. The method of claim 8, further comprising the at least one server transmitting the at least one message to the gaming device to cause the gaming device to at least one of animate the outcome, animate the base counter being incremented, and animate the number of the jackpot features.

14. The method of claim 8, further comprising animating a progress towards obtaining one or more of a plurality of second tickets that comprise at least one of a value and a progress bar graphic.

15. A non-transitory computer-readable medium comprising a plurality of instructions which, when executed, cause at least one processor to perform the steps of:

controlling a gaming device to animate a base game outcome based on a random event generated by a random number generator;

transmitting a first graphic sequence to the gaming device for animating a portion of the base game outcome being moved from the base game outcome to increment a base counter when the base game outcome meets an eligibility for a first jackpot feature among a plurality of jackpot features, wherein the plurality of jackpot features have volatilities that increase with increasing eligibilities, and at least two of the plurality of jackpot features have different eligibilities;

controlling the gaming device to animate a feature counter being incremented when the base counter reaches a feature eligibility;

transmitting a second graphic sequence to the gaming device for animating one or more of the plurality of jackpot features that have become available based on the feature counter has reached a threshold;

interactively receiving one of the plurality of jackpot features that are available from the gaming device; and controlling the gaming device to initiate the one of the plurality of jackpot features selected.

16. The non-transitory computer-readable medium of claim 15, wherein the eligibility is met when the portion of the base game outcome includes a ticket symbol, and wherein the instructions, when executed, further cause the at least one processor to perform the step of transmitting the first graphic sequence to the gaming device for animating the ticket symbol being moved from the base game outcome into the base counter.

17. The non-transitory computer-readable medium of claim 15, wherein the instructions, when executed, further cause the at least one processor to perform the step of controlling the gaming device to animate the base game outcome based on a player interaction with the random event.

18. The non-transitory computer-readable medium of claim 15, wherein the eligibility comprises a plurality of first tickets, each of the plurality of first tickets being accumulated based on the base game outcome.

19. The non-transitory computer-readable medium of claim 18, wherein each of the plurality of first tickets corresponds to a defined credit amount wagered.

20. The non-transitory computer-readable medium of claim 15, wherein the instructions, when executed, further cause the at least one processor to perform the step of animating a progress towards obtaining one or more of a plurality of second tickets that comprise at least one of a value and a progress bar graphic.

* * * * *